United States Patent Office 3,285,969
Patented Nov. 15, 1966

3,285,969
DIVINYL ACETALS AND THE PREPARATION THEREOF
Tommy L. Tolbert, Chapel Hill, and Edgar Herbert Pitts, Jr., Durham, N.C., assignors to Monsanto Company, St. Louis, Mo., a corporation of Delaware
No Drawing. Filed Dec. 27, 1962, Ser. No. 247,539
5 Claims. (Cl. 260—615)

This invention relates to new compositions of matter. More particularly, this invention relates to divinyl acetals and to the preparation thereof.

It is known in the art that divinyl acetals may be prepared by the dehydrohalogenation of bis(2-haloethyl)acetals by the gradual addition of the halogen-containing acetal to fused, powdered alkali hydroxide heated to temperatures ranging from 170° C. to 300° C. It has been found, however, that divinyl acetals prepared by dehydrohalogenation at temperatures near 200° C. and above contain small amounts of alkenyl 2-haloethyl ethers. These ethers generated by thermal decomposition of the bis(2-haloethyl)acetals, form apparent azeotropes with the acetals and are extremely difficult to remove. The presence of this material is particularly undesirable since even a trace of it can act as a chain terminator in the polymerization of a divinyl acetal. Therefore, it would be advantageous to prepare divinyl acetals which are essentially free from by-products such as alkenyl 2-haloethyl ethers.

It is an object of this invention to provide divinyl acetals essentially free of alkenyl 2-haloethers.

It is another object of this invention to provide a process for the production of divinyl acetals which are essentially free of by-products.

It is another object of this invention to provide a more convenient process for the preparation of divinyl acetals which are essentially free of by-products.

Other objects and advantages of this invention will hereinafter become apparent from the following detail description thereof and the appended claims.

The objects of this invention are achieved by the dehydroiodination of bis(2-iodoethyl)acetals in the presence of an anhydrous alkali hydroxide, preferably sodium hydroxide or potassium hydroxide, and at a temperature of less than 150° C.

The divinyl acetals prepared in accordance with this invention are those having the general formula

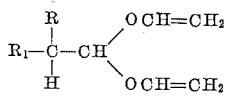

wherein R and $R_1$, being the same or different, are members selected from the group consisting of hydrogen and alkyl radicals having a carbon content of from 1 to 7 with the total number of carbon atoms in R and $R_1$ not exceeding 7. Illustrative of divinyl acetals that may be prepared according to this invention are acetaldehyde divinyl acetal, n-propionaldehyde divinyl acetal, isopropionaldehyde divinyl acetal, n-butyraldehyde divinyl acetal, isobutyraldehyde divinyl acetal, n-valeraldehyde divinyl acetal, isovaleraldehyde divinyl acetal, n-caproaldehyde divinyl acetal, n-heptaldehyde divinyl acetal, and the like. It is to be understood that other divinyl acetals in which R is aliphatic, alicyclic, aromatic, heterocyclic, polycyclic, polyheterocyclic, and the like, may be prepared in accordance with this invention.

The formation of divinyl acetals by dehydrohalogenation of bis(2-haloethyl)acetals in the presence of fused, powdered potassium hydroxide at temperatures near or in excess of 200° C. is well known. If the β carbon atoms of the bis-(2-haloethyl)acetal starting materials are protonated, vinyl ethers are formed as by-products of the reaction during the dehydrohalogenation at these high temperatures. These vinyl ethers are present in amounts which are deleterious and are extremely difficult to remove. For example, 4–20 percent of vinyl 2-chloroethyl ether may be formed as a by-product of acetaldehyde divinyl acetal synthesis. This ether concentration may not be reduced below 3–4 percent by ordinary distillation procedures.

Formation of these vinyl ethers may be easily prevented by preparing the divinyl acetals at a temperature of below 150° C. Dehydrohalogenation at temperatures below 150° C. and in the presence of caustic is accomplished by the use of a bis(2-iodoethyl)acetal, which loses hydrogen iodide in the presence of caustic at temperatures of above 50° C.

The bis(2-iodoethyl)acetals may be obtained by well known methods. A conventional method for their preparation is to synthesize bis(2-chloroethyl)acetal by heating a mixture of an aldehyde, ethylene chlorohydrin, and powdered, freshly ignited calcium chloride. The bis(2-chloroethyl)acetals are easily converted to their iodo analogs by a transiodination reaction using acetone and an alkali iodide. The following equations demonstrates this procedure:

$$CH_3CHO + 2HOCH_2CH_2Cl \rightarrow$$
$$CH_3CH(OCH_2CH_2Cl)_2 + H_2O$$

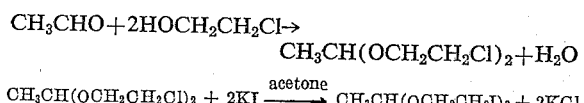

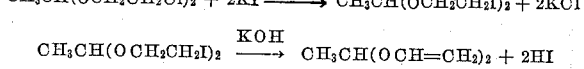

Whereas the dehydrohalogenation of bis(2-chloroethyl)acetal as done previously may be shown by the following equations:

$$CH_3CHO + 2HOCH_2CH_2Cl \rightarrow$$
$$CH_3CH(OCH_2CH_2Cl)_2 + H_2O$$

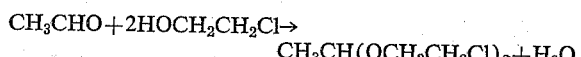

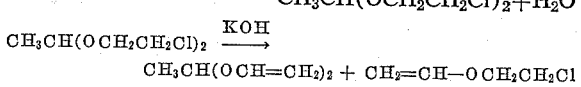

The formation of the divinyl acetals by dehydroiodination of bis(2-iodoethyl)acetals may be conveniently effected by the gradual addition of the iodine-containing acetal to an anhydrous, powdered alkali hydroxide at room temperature, about 23° C. The reaction is then refluxed at a temperature of from about 50° C. to 150° C. It is preferred that the reflux temperature be in a range of from about 80° to 140° C. The reaction is preferably carried out with agitation and in an atmosphere of nitrogen to prevent discoloration of the product and to reduce the possibility of any by-products being formed. The divinyl acetal is distilled from the reaction mixture and is collected along with the water formed. The organic distillate is separated from the water layer, dried, and fractionated to give the divinyl acetal.

A convenient, generalized preparation of the divinyl acetals of this invention is as follows: A solution of 1 mole of a bis(2-chloroethyl)acetal, 600 ml. of anhydrous acetone and 2 moles of an alkali iodide are refluxed with stirring in a 1-liter flask equipped with a magnetic stirrer and a water-cooled condenser protected by a drying tube. After 20 hours the resulting mixture of bis(2-iodoethyl) acetal and potassium chloride is cooled and filtered. The salt is thoroughly washed with xylene and discarded; the washings are added to the filtrate. The filtrate, after being stripped of acetone, is mixed with 800 ml. of a hydrocarbon of an appropriate boiling range and 4 moles of an anhydrous powdered alkali hydroxide. The mixture is refluxed with stirring for 30 hours in a 2-liter, 3-necked flask fitted with a mechanical stirrer and a reflux condenser. After cooling, the liquid is decanted from the solid cake which will form during the reflux period. The cake is dissolved in water and the solution is extracted with hydrocarbon. The decantate and hydrocarbon extracts are combined and, after drying over potassium carbonate, distilled. As a precaution, small amounts of potassium carbonate and hydroquinone may be added to the solution prior to distillation. The distillate is redistilled under the same conditions through a Todd column having about 30 theoretical plates. The product is stored under nitrogen in the cold. Purity of the acetals prepared by this method may be verified as 100 percent by gas chromatography.

Polymers formed from divinyl acetals may be shaped or formed by molding, extruding, casting, and the like. These polymers are useful for the preparation of plastics, coatings, films adhesives, and the like. For any of these purposes the polymers formed from the divinyl acetals may be combined with or prepared in the presence of plasticizers, fillers, pigments, stabilizers, softeners, proteins, dyes, oils, rubber or rubber substitutes, natural resins, other synthetic resins, and the like. The compositions are also useful for impregnating materials such as leather, metals, glass, stone, textiles, paper, brick, plaster, and the like. The presence of alkenyl ethers in the divinyl acetal monomer seriously limit their usefulness in the preparation of divinyl acetal polymers due to the fact that the alkenyl ethers act as terminators in the cyclopolymerization of the acetals. In addition, polymers made from the divinyl acetals have value in that they may be easily converted to polyvinyl alcohols by hydrolysis.

The following examples are intended to illustrate the present invention more fully, but are not intended to limit the scope of the invention, for it is possible to effect many modifications therein. In the examples, all parts and percents are by weight unless otherwise indicated. Yields of divinyl acetals given are based on the conversion of the haloacetal intermediate.

*Example 1*

Preparation of butyraldehyde divinyl acetal from butyraldehyde bis(2-chloroethyl)acetal at temperatures in excess of 200° C.

A solution of 90 grams (1.25 moles) of freshly distilled n-butyraldehyde, 161 grams (2.01 moles) of freshly distilled 2-chloroethanol, 7 grams of anhydrous hydrogen chloride, and 250 ml. of dry benzene was placed in a 1-liter, 3-necked flask fitted with a mechanical stirrer, a pot thermometer, a Barrett trap, and a water-cooled condenser. The mixture was gently refluxed with stirring for 32 hours, during which time 17 grams of water was collected. The reaction was then stripped of benzene and distilled under a vacuum. A crude yield of 134.5 grams of butyraldehyde bis(2-chloroethyl)butyral was obtained. Careful redistillation gave 97.7 grams of purified acetal representing a yield of 45.4 percent.

A 1-liter, 4-necked resin pot was fitted with a mechanical stirrer, a pot thermometer protected by a thermowell, a 500 ml. addition funnel, and a 12 inch bulb condenser. A simple still head, connected to a water-cool condenser leading to a vented receiver, was placed in the top of the bulb condenser. In the addition funnel was placed 485 grams (2.25 moles) of bis(2-chloroethyl)butyral, and in the pot was placed 490 grams (8.68 moles) of anhydrous, powdered potassium hydroxide. About 50 grams of the acetal was added to the pot, and the resulting mixture was heated to 220° C. as the rest of the acetal was slowly added to the reaction mixture. Butyraldehyde divinyl acetal, B.P. 140° C., and water were distilled from the mixture as formed. This addition required two hours. The two layers of the distillate obtained from the reaction were separated, and the aqueous layer was discarded. The organic layer (227.7 grams) was dried over magnesium sulfate and distilled under a vacuum. Five-tenths of a gram of copper powder and two tenths of a gram of hydroquinone were added to the pot prior to distillation as a safety factor. A total of 151 grams of butyraldehyde divinyl acetal, boiling at about 56° C. at 28 mm. was collected. Gas chromatography on a F & M 202 Temperature-Programmed Gas Chormatograph showed the material to be 98.9 percent pure, the impurity being 2-chloroethyl 2-butenyl ether. Redistillation through a Todd column of about 30 plates failed to remove all of the ether. The yield of the acetal was approximately 47 percent.

*Example 2*

Preparation of propionaldehyde divinyl acetal from propionaldehyde bis(2-iodoethyl)acetal at a temperature of less than 150° C.

A mixture of 50 grams of calcium chloride and 445 grams (5.6 moles) of ethylene chlorohydrin was placed in a 2-liter, 3-necked flask fitted with a mechanical stirrer, a pot thermometer, an addition funnel, and a water-cooled condenser. The mixture was cooled to 5° C. and held at this temperature as 161 grams (2.84 moles) of propionaldehyde was slowly added to the mixture while the mixture was stirred. After an hour the mixture was allowed to warm to 25° C. and was stirred at this temperature for 18 hours. The organic layer of the reaction mixture was then separated from the mixture, washed thoroughly with water, and dried over magnesium sulfate. Distillation gave 196 grams of pure propionaldehyde bis(2-chloroethyl)-acetal, representing a yield of 35%. Purity was verified by gas chromatography.

A solution of 100.5 grams (0.5 mole) of propionaldehyde bis(2-chloroethyl)acetal, 300 ml. of acetone, and 150 grams (1 mole) of sodium iodide was refluxed with stirring in a 1-liter flask equipped with a mechanical stirrer and a reflux condenser. After 20 hours the resulting mixture of propionaldehyde bis(2-iodoethyl)acetal and sodium chloride was cooled and filtered.

The filtrate was mixed with 112 grams (2 moles) of anhydrous, powdered potassium hydroxide in 400 ml. of anhydrous benzene. The mixture was refluxed (78–80° C.) with stirring for 24 hours. After cooling, the reaction mixture was filtered. This filtrate was then distilled and 21.2 grams (B.P. 121° C./754 mm.) of propionaldehyde divinyl acetal was obtained representing a yield of 33.1%.

*Example 3*

Preparation of acetaldehyde divinyl acetal from acetaldehyde bis(2-chloroethyl)acetal at temperatures in excess of 200° C.

A mixture of 1416 grams (17.6 moles) of freshly distilled 2-chloroethanol and 167 grams of anhydrous calcium chloride was placed in a 1-liter, 3-necked flask fitted with a mechanical stirrer, a pot thermometer, an addition funnel, and a water-cooled condenser. The mixture was cooled to 3° C. and the slow addition of 416 grams (9.5 moles) of acetaldehyde was begun with constant stirring. The reaction temperature was held below 18° C. during the addition of acetaldehyde. The resulting mixture, in the form of two layers, was allowed to stand for 24 hours before the mixture was filtered and the two layers were separated. The organic layer was distilled to give 1040 grams (5.56 moles) of acetaldehyde bis(2-chloroethyl)acetal, representing a yield of about 59 percent.

A 2-liter, 4-necked resin pot was fitted with a mechanical stirrer, a pot thermometer protected by a thermowell, a 500-ml. addition funnel, and a 12 inch bulb condenser. The top of the condenser was fitted with a simple stillhead connected to a Liebig water-cooled condenser. The flow of water through the bulb condenser was sufficiently slow to allow distillation of low boiling materials. In the addition funnel was placed 270 grams (1.44 moles) of acetaldehyde bis(2-chloroethyl)acetal, and in the pot was placed 325 grams (5.80 moles) of anhydrous, powdered potassium hydroxide. About 50 grams of the acetal was added to the pot, and the resulting mixture was heated to 220–230° C. as the rest of the acetal was slowly added to the reaction. This addition required about four hours. Acetaldehyde divinyl acetal and water were distilled from the mixture as formed. Two layers of the distillate obtained from the reaction were separated, and the aqueous layer was discharded. The organic layer (200 grams) was dried over magnesium sulfate and distilled under a vacuum. As a precaution small amounts of potassium carbonate and hydroquinone were added to the solution prior to distillation. A total of 125.2 grams of acetaldehyde divinyl acetal was collected. Gas chromatography using a F & M 202 Temperature-Programmed Gas Chromatograph showed the material to be only 95.3 percent pure, the impurity being 2-chloroethyl vinyl ether. Redistillation through a Todd column failed to improve the purity.

*Example 4*

Preparation of acetaldehyde divinyl acetal using acetaldehyde bis(2-iodoethyl)acetal at a temperature of less than 150° C.

A solution of 187 grams (1 mole) of acetaldehyde bis (2-chloroethyl)acetal prepared according to the procedure of Example 3, 600 ml. of anhydrous acetone, and 300 grams (2 moles) of sodium iodide was refluxed with stirring in a 1-liter flask equipped with a magnetic stirrer and a water-cooled condenser protected by a drying tube. After 18 hours the resulting mixture of acetaldehyde bis (2-iodoethyl)acetal and sodium chloride was cooled and filtered. The salt was thoroughly washed with xylene and discarded, the washings being added to filtrate.

The filtrate, after being stripped of acetone, was mixed with 1000 ml. of xylene and 224 grams (4 moles) of anhydrous, powdered potassium hydroxide. The mixture was refluxed with stirring for 30 hours in a 2-liter, 3-necked flask fitted with a mechanical stirrer, a Dean-Stark trap, and a reflux condenser. About 45 ml. of water was collected in the trap during the reflux. After cooling, the liquid was decanted from the solid cake which had formed during the reflux period. The cake was dissolved in water and the solution was extracted with xylene. The decantate and xylene extracts were combined, dried over potassium carbonate, and distilled. As a precaution small amounts of potassium carbonate and hydroquinone were added to the solution prior to distillation. The distillate was redistilled under the same conditions through a Todd column having about 30 theoretical plates. A quantity of 46.5 grams of acetaldehyde divinyl acetal was obtained, representing a yield of 41 percent. This product was 100 percent pure as shown by gas chromatography using a F & M 202 Temperature-Programmed Gas Chromatograph.

*Example 5*

Preparation of formaldehyde divinyl acetal from formaldehyde bis(2-chloroethyl)acetal at temperatures less than 150° C.

A solution of 173 grams (1 mole) of formaldehyle bis(2-chloroethyl)acetal, 600 ml. of anhydrous acetone, and 300 grams (2 moles) of sodium iodide was refluxed with stirring in a 1 liter flask equipped with a magnetic stirrer and a water-cooled condenser protected by a drying tube. After 20 hours the resulting mixture of formaldehyde bis(2-iodoethyl)acetal and sodium chloride was cooled and filtered. The salt was thoroughly washed with xylene and discarded, the washings being added to the filtrate.

The filtrate, after being stripped with acetone, was mixed with 100 ml. of benzene, 700 ml. of xylene, and 224 grams (4 moles) of anhydrous, powdered potassium hydroxide. The mixture was refluxed with stirring for 30 hours in a 2-liter, 3-necked flask fitted with a mechanical stirrer and a reflux condenser. After cooling, the liquid was decanted from the solid cake which had formed during the reflux period. The cake was dissolved in water and the solution was extracted with xylene. The decantate and the xylene extracts were combined, dried over potassium carbonate, and distilled. As a precaution small amounts of potassium carbonate and hydroquinone were added to the solution prior to distillation. The crude distillate of about 215 ml., boiling at 75–115° C., was redistilled through a Todd column. A 46.5 gram fraction boiling at 86–92° C. was obtained. Gas chromatography using a F & M 202 Temperature-Programmed Gas Chromatograph showed it to contain 4.6 percent of benzene and 95.4 percent of formaldehyde divinyl acetal. The acetal may be readily obtained in 100 percent purity if a higher boiling solvent than benzene, such as toluene, is used in combination with the bulk solvent, xylene.

As many widely different embodiments of this invention may be made without departing from the spirit and scope thereof, it is to be understood that the invention is not limited to the specific embodiments thereof except as defined in the appended claims.

We claim:

1. A process for the preparation of a divinyl acetal having the formula

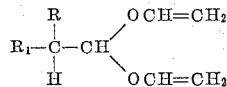

wherein R and $R_1$ are members of the group consisting of hydrogen and alkyl radicals having a carbon content of from 1 to 7 with the total number of carbon atoms in R and $R_1$ not exceeding 7, said acetal being substantially free of alkenyl 2-haloethyl ethers, which comprises dehydroiodinating the corresponding bis(2-iodoethyl) acetal at a temperature of from about 50° C. to about 150° C. in the presence of an anhydrous alkali hydroxide.

2. A process for the preparation of a divinyl acetal having the formula

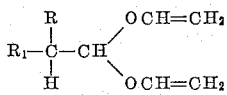

wherein R and $R_1$ are members of the group consisting of hydrogen and alkyl radicals having a carbon content of from 1 to 7 with the total number of carbon atoms in R and $R_1$ not exceeding 7, said acetal being substantially free of alkenyl 2-haloethyl ethers, which comprises dehydroiodinating the corresponding bis(2-iodoethyl)acetal at a temperature of from 80° C. to about 140° C. in the presence of an anhydrous alkali hydroxide.

3. A process as defined in claim 1 wherein the divinyl acetal is acetaldehyde divinyl acetal.

4. A process as defined in claim 1 wherein the divinyl acetal is n-propionaldehyde divinyl acetal.

5. A process as defined in claim 1 wherein the divinyl acetal is butyraldehyde divinyl acetal.

References Cited by the Examiner

UNITED STATES PATENTS

| 2,299,189 | 10/1942 | Swan | 260—615 X |
| 2,374,078 | 4/1945 | Coffman | 260—86 |
| 2,962,534 | 11/1960 | Montagna et al. | 260—615 X |

FOREIGN PATENTS 1,013,976  5/1952  France.

OTHER REFERENCES

Matsoyan et al.: Chem. Abs., vol. 54 (1960), page 24, 358.

Matsoyan et al.: Zhur. Obshchei Khim., vol. 30 (1960), pp. 697–698.

LEON ZITVER, *Primary Examiner.*

B. HELFIN, H. T. MARS, *Assistant Examiners.*